(No Model.) 7 Sheets—Sheet 5.

W. R. STEINER.
CORN HARVESTER.

No. 526,755. Patented Oct. 2, 1894.

Witnesses
F. L. Ourand
C. Trevill

Inventor
W. R. Steiner
by Hosmer & Hughman
Attorneys (No Model.) 7 Sheets—Sheet 6.

W. R. STEINER.
CORN HARVESTER.

No. 526,755. Patented Oct. 2, 1894.

Witnesses
F. L. Ourand
L. Trevill

Inventor
W. R. Steiner
by Hoenes & Kaufmann
Attorneys

UNITED STATES PATENT OFFICE.

WILLIAM R. STEINER, OF FREDERICK, MARYLAND.

CORN-HARVESTER.

SPECIFICATION forming part of Letters Patent No. 526,755, dated October 2, 1894.

Application filed May 2, 1893. Serial No. 472,678. (No model.)

*To all whom it may concern:*

Be it known that I, WILLIAM R. STEINER, a citizen of the United States of America, residing in Frederick, in the county of Frederick, in the State of Maryland, have invented a new and useful Corn-Harvester, of which the following is a specification.

My invention has relation to improvements in corn-harvesters, and the object is to provide improved means and mechanism for cutting, gathering, carrying, and delivering the cut-stalks in quantities or bundles or shocks with a bundle or shock-box.

I have fully and clearly illustrated my invention in the accompanying drawings, wherein—

Fig. 4 is a plan view of the base frame of the machine which carries the operative gearing and shafting.

The machine is supported on a suitable frame, designated in general by the reference letter A. This frame A is composed of end pieces 1, 2, intermediate pieces 3, 4, connected by transversely laid sills 5, 6, and the intermediate piece 7, extending from the end piece 1, to the sill 4, substantially as shown in Fig. 4 of the drawings. This frame is carried on the ground or driving wheel 8, and the side-wheel 9. The ground-wheel 8 has its axle 10, mounted in suitable boxes 11, on the frame, and on the shaft or axle is fixed a sprocket-wheel 12, on which is a sprocket-chain 13, carried about a smaller sprocket-wheel 14, loosely mounted on a shaft 15, and made fast or loose with the said shaft 15 by a sliding-clutch 16, operated by a clutch-lever 17, suitably fulcrumed to move the clutch and wheel in and out of engagement.

On the inner end of the shaft 15 is a beveled gear-wheel 18, which meshes with a beveled gear-wheel 19, on the shaft 20, on the former end of which shaft is a disk-crank 21, the pin 22, of which carries one end of the connecting-rod 23, attached to the reciprocating cutters 24. These cutters may be of any of the approved forms or constructions for severing stalks, and be mounted in the usual bars and guides. I have shown only the cutters, as this element does not form part of the present invention, except as the cutters may constitute an element in combination with other and novel portions of the machine.

On the shaft 20 is a gear-wheel 25, which meshes in a gear wheel 26, on a shaft 27, carrying on its rear end a sprocket-wheel 28, on which is a chain 29, arranged about a sprocket-wheel 30, on a shaft 31, carrying on its end at the front of the machine, a beveled gear-wheel 32, meshing in a beveled gear-wheel 33, on the foot or lower end of the vertical shaft 34, on the reel at that side of the machine.

On the shaft 31 is a beveled gear-wheel 35, meshing with a beveled gear-wheel 36, on a shaft 37, journaled across the machine parallel with the sill 7, in boxes 38 and having on its outer end a beveled gear-wheel 39, meshing with a beveled gear-wheel 40, on a shaft 41, carrying on its front end a beveled gear-wheel 42, meshing with a beveled gear-wheel 43, fixed on the lower end of the vertical shaft 44, of the reel at that part of the machine.

Figure 3:
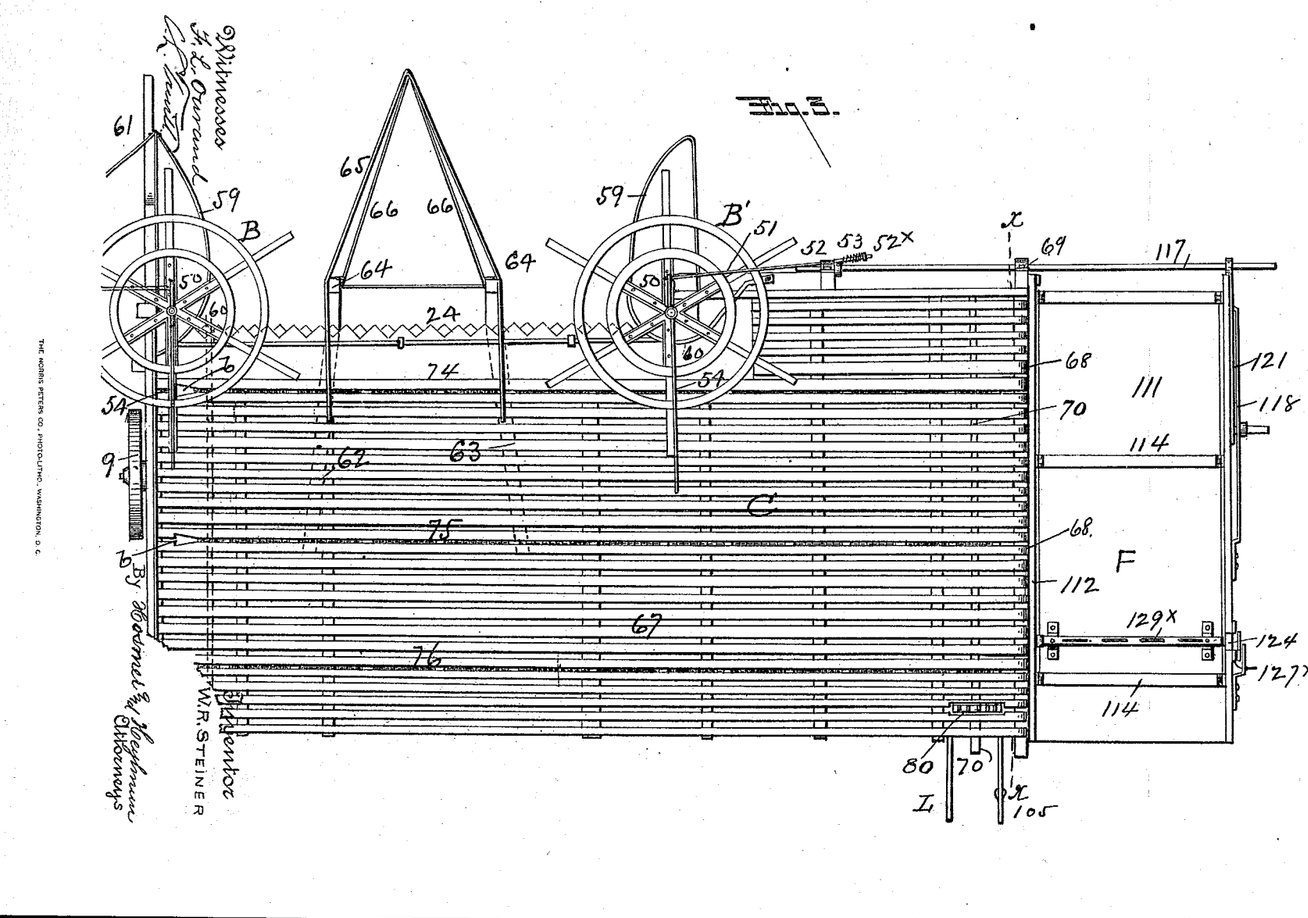
Fig. 3 is a plan view of the machine.

B, B', designate the reels supported on vertical shafts $34^\times$, 44, journaled in boxes 45, 46, secured to vertical supports 47, erected at the front of the machine, as shown in Fig. 3 of the drawings; the lower ends of said vertical shafts being sustained in similar or other suitable bearings. Not shown.

Figures 2, 14:
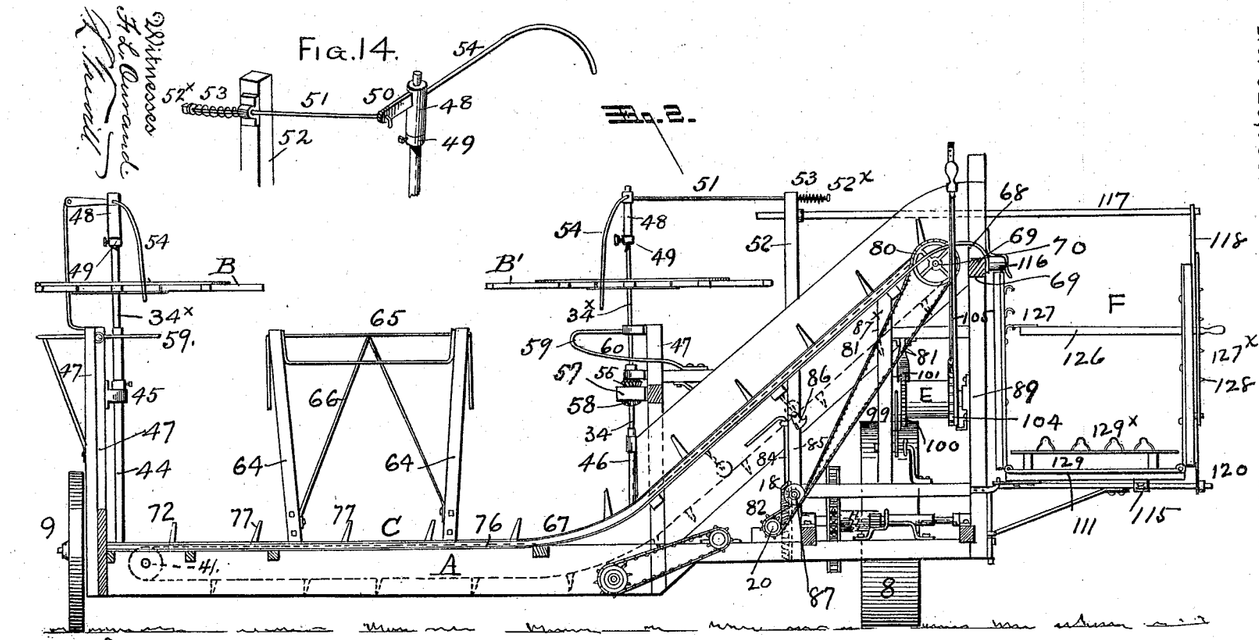
Fig. 2 is a transverse section across the machine lengthwise of the floor thereof.
Fig. 14 is a detail of the guard-arm projected over the reels, showing connected thereto the adjusting restraining rod.

The arms of the reels are directed radially, and are strengthened by rings secured thereto, which not only strengthen the reels but also prevent the stalks, standing or cut, from being pushed or drawn too far into the reels. The shaft of each reel is extended above the hub of the reel, as shown in Fig. 2, and on the top end of the shaft is a socket-piece 48, the lower end of which takes over the end of the reel shafts and rests on a collar 49, on the respective shafts. From this socket-piece 48 projects an arm or stud 50, to the outer end of which is connected a rod 51, let loosely through a support 52, and on the projecting end of this rod 51, is a collar or nut $52^\times$, between which and the support of the rod, is arranged a spring 53.

Secured to the stem of the piece 48, and projected inward over the reels and beyond the same, and turned down as shown in Figs. 2 and 3 of the drawings, is a bar 54, which stands just free from the path of the reels, so that when the corn is turned in to fall on the floor of the machine, these yielding and resilient bars intercept it and prevent it from being carried on around and by the reels. The bars 54 are held in normal position by the agency of the rods 51, and are permitted to yield to the extent of the movement of these latter rods.

The shaft $34^\times$, of the reel B' carries a bevel gear-wheel 55, on its lower end meshing in a double bevel-gear 56, mounted in a boxing 57, and this latter gear meshes in a gear 58, on the upper end of the shaft 34; this arrangement of gearing being adapted for convenience of location of this reel in its relation to the floor of the machine.

Below the reels are secured guards 59, consisting of suitable bars of metal bent with a curved inner part 60, with the extremity or point extended beyond the reels and designed to strike a row of corn and bear or direct it inward for the engagement of the reels. On the inner guard is a fender bar 61, intended to prevent the adjacent row of corn from being acted on by the reel.

Under the frame of the machine are secured two bars 62, 63, by any proper fastenings. These extend beyond the cutters at the front of the machine, and have secured to them standards 64, carrying on their upper ends a V-shaped frame or bar 65, arranged with the point front of the machine, substantially as seen in the drawings. The point of this bar is braced by a brace-rod 66, and the projecting rear ends of the bars 65 are also suitably braced. This frame or device is moved between the two rows of corn subjected to the action of the machine, and straightens up such stalks as may be leaning over, and it also directs the cut stalks back to the machine.

It will be perceived from the foregoing description in connection with the drawings, that by the guards associated with the reels and the centrally disposed frame, the rows of corn are directed with certainty to the action of the machine and the cut stalks are thrown directly across on the table or floor.

Figure 6:
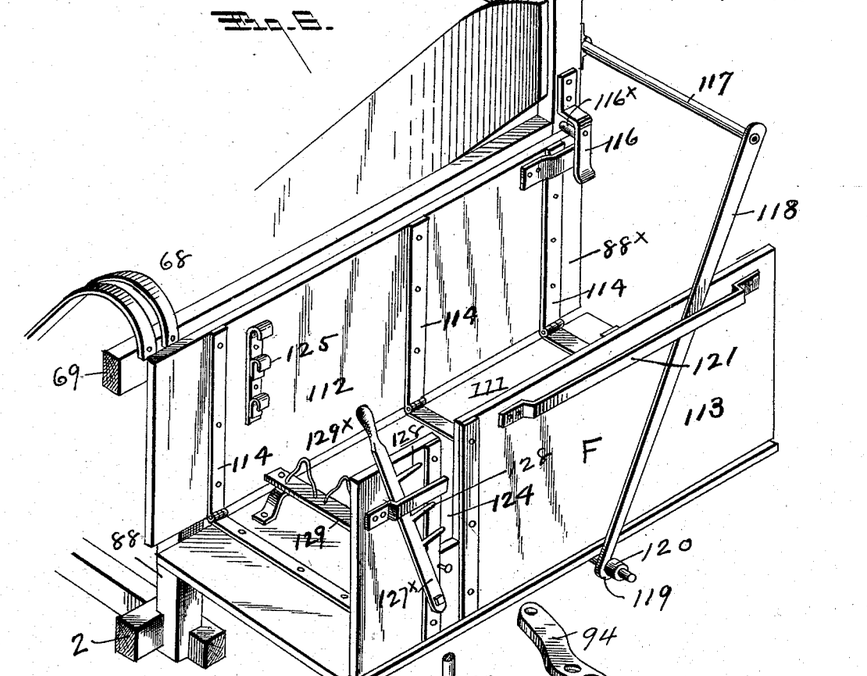
Fig. 6 is a perspective of the shock-box, showing it in position to receive the cut stalks from the floor of the machine.

C designates the floor of the machine, consisting of a sufficient number of metal strips 67, arranged parallel with each other with spaces between them. The metal strips 67 extend integral the whole length of the floor and incline, as shown. This table is substantially horizontal at that portion on which the stalks are delivered and then inclined upward, substantially as shown in Fig. 2 of the drawings; the ends of the metal slats being curved and bent over as seen at 68, in Figs. 2 and 3, and have the ends secured to a cross-bar 69, as seen in Fig. 6 of the drawings. This floor or table is supported on cross-pieces or sills, substantially as shown.

Figure 15:
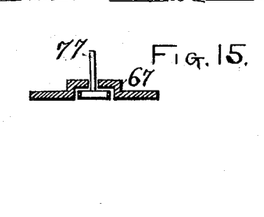
Fig. 15 is a transverse section through one of the chain-ways.
Figure 16:
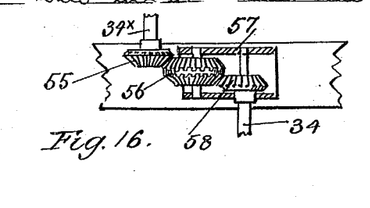
Fig. 16 is a detail side view of the double bevel gear and connections for operating the inner reel-shaft.

At the top of the inclined portion of the table is journaled a shaft 70, upon which is fixed sprocket-wheels 71, and at the other end of the table is journaled a shaft 41, upon which are mounted sprocket-wheels 73, in alignment with those on the shaft at the end of the incline. On these sprocket-wheels are arranged the carrying chains 74, 75, 76. To keep the chains in alignment with the table the strips adjacent thereto have their edges turned up and over as shown in Fig. 15 of the drawings, leaving a slot between the turned in edges, through which the carrying pins of the chain-links travel, the chains being held in the ways of the bars or slats by the turned-in edges.

Figures 8, 9, 10, 11, 12, 13:
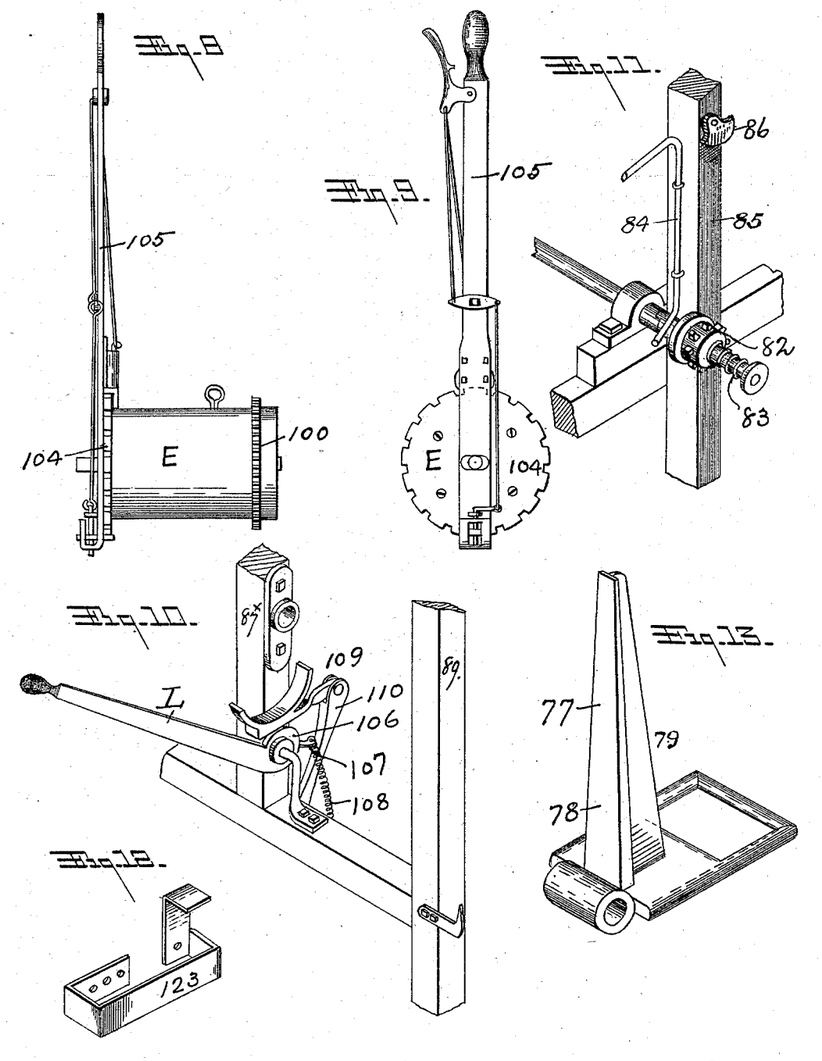
Fig. 8 is a detail of the lifting drum and its actuating lever.
Fig. 9 is an end view of the lever and drum shown in Fig. 8.
Fig. 10 is a detail perspective of the friction device or brake to control the reversal of the drum when the shock-box descends to normal position.
Fig. 11 is a detail perspective of the clutch on the shaft for operating the knives or cutters.
Fig. 12 is a perspective of the guide piece on the bottom of the shock box.
Fig. 13, is a perspective of one of the chain-links with vertical carriers.

The links of the chains carrying the pins are illustrated in Fig. 13 wherein is shown a plate formed integral with the link, from which plate projects a vertical pin 77, consisting of a flat bar 78, tapered from the base to the upper end and provided with a bracing flange 79, also tapered and set at right angles to the front portion.

On the shaft 70 is a sprocket-wheel 80, carrying a sprocket-chain 81, which is extended downward and arranged about the smaller sprocket-wheel 82, on the shaft 20. This sprocket-wheel 82 is loosely mounted on its shaft and is provided with a clutch which engages with a counterpart fixed on the shaft. The clutch mechanism of this sprocket-wheel 82 is normally held in engagement by means of a spring 83 arranged on the projecting end of the shaft 20, and is disengaged by pressing back the spring with the sprocket-wheel and then turning the end of a bar 84, against the collar of the wheel. The bar 84 is held in keepers on the standard or post 85 of the machine and has the lower end bent at right angles to its stem so that when the bar is turned with its end abutting against the collar of the sprocket-wheel it may be so held by the engagement of a latch 86, with the arm at the upper end of the bar. (See Figs. 2 and 11.) The chain 81 has its tension increased by an idler 87, bearing thereon.

It will be seen from the foregoing description, that the carrying chains of the table may be stopped in their movements by disengaging the clutch controlling the wheel 82. At the lower end of the table openings are formed, as $b$, to admit the carrying-pins of the chains to pass into the slots in the ways.

Figure 5:
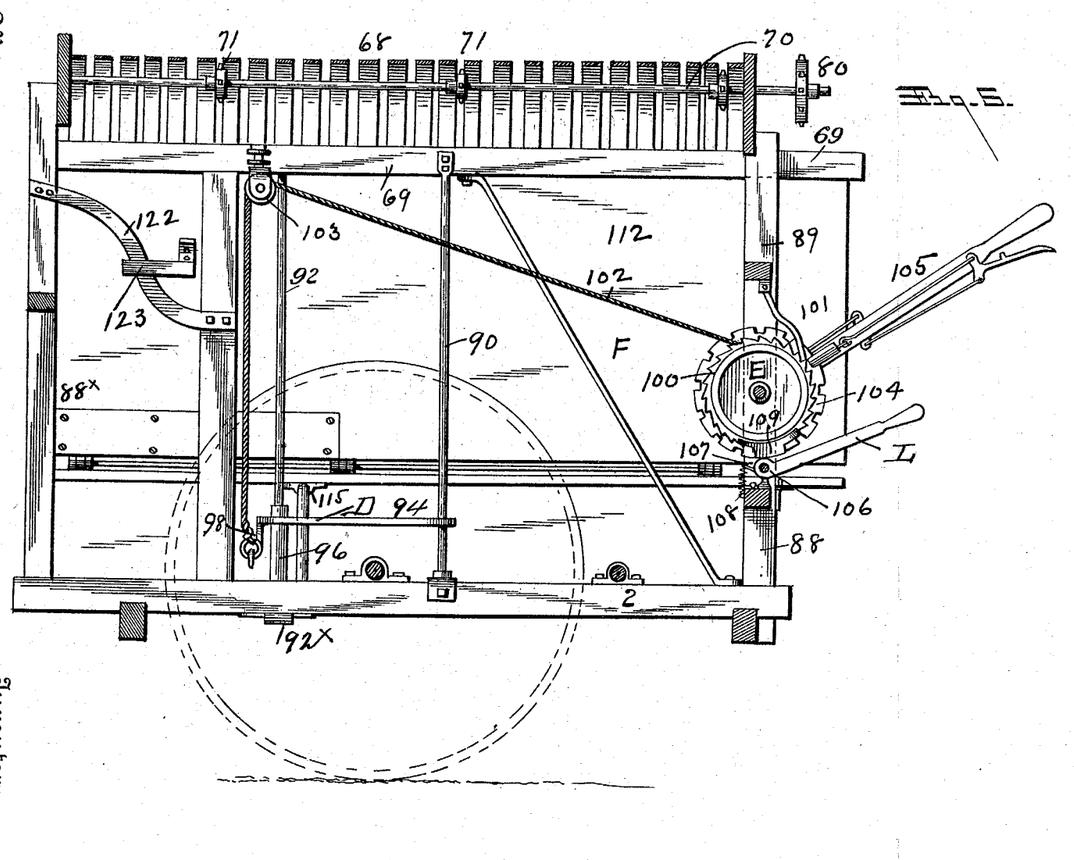
Fig. 5 is a vertical transverse section on the line $x$—$x$ of Fig. 3, showing the means for lifting the shock-box and its guide, and the upper shaft carrying sprocket-wheels for the carrying chains which travel through the floor.

At the end of the bottom frame A, being the outer end, or end adjacent to the cut rows of corn, is erected a vertical frame composed of vertically arranged posts 88, 88$^\times$, and intermediate post 89, having their lower ends mortised in the end piece 2, and connected to and supporting at their upper ends the top-piece 69, which supports the upper end of the inclined part of the floor, as seen in Fig. 5 of the drawings.

Figure 7:
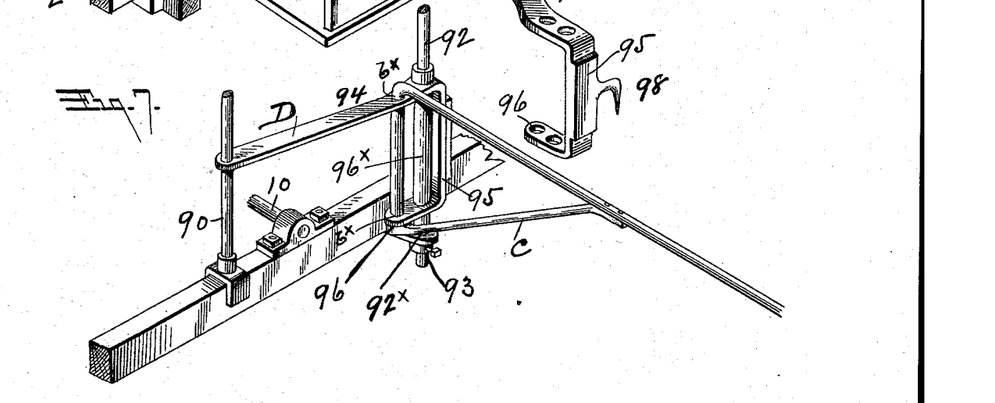
Fig. 7 is a detail perspective of the supports for the shock-box, the vertically sliding bracket being shown in detail to the right.

90 designates a vertical rod having its upper end secured to the top piece 69 and its lower end set in a step-bearing 91. (See Figs. 6 and 7.) Parallel with the rod 90 is another rod 92, having its upper end also secured to the top piece 69 and its lower end shouldered to project through and sit on a bearing 92$^\times$ on the sill 2, and to prevent the bar from rising or being lifted out of its bearing when the shock-box bracket is lifted, as hereinafter specified, a collar 93, with set-screw is fitted on the projecting end of the shaft below the lower bearing, as seen in Fig. 7 of the drawings.

D designates the bracket which supports the shock-box. This bracket consists of a substantial bar having a horizontal limb 94, a vertical part 95, at right angles to the limb 94, and an end part 96, directed inward and parallel with the portion 94, as seen in Fig. 7 of the drawings. In this bracket is fixed a sleeve 96$^\times$, which takes in and slides vertically on the bar 92; and the limb 94 has a hole in the outer end, which takes the bar 90, which serves as a guide-bar. In this bracket is hung the crane which supports the shock-box. The vertical post or part of this crane turns in bearings $b^\times$, in the bracket D, and a brace $c$, strengthens the horizontal bar of the crane. (See Fig. 7.) On the vertical bar 95 of the bracket is a hook 98, to which the end of the lifting-rope or chain is connected. (See Fig. 5 and detail in Fig. 7.)

E designates a drum journaled in suitable bearings secured to the uprights 87$^\times$ and 89, and provided with an annular ratchet 100, arranged a distance from the end of the drum, as shown, which ratchet is engaged by a pawl 101, to prevent the reversal of the drum when winding up the rope in lifting the shock-box.

To the drum E is fastened one end of the rope 102, which is carried over a sheave 103, on the top piece 69, and the other end connected to the hook 98, on the shock-box bracket. On the end of the drum E is a notched-disk 104, which is engaged by the spring-catches on a lever 105, loosely fulcrumed on the shaft of the drum, (see Fig. 9,) and having upper and lower spring-catches to engage the notches in the disk, as shown in the drawings. L designates a lever fulcrumed under the drum E and having an eccentrically formed enlargement 106, about its fulcrum, from which projects an arm 107, the outer end of which is connected to a spring 108, the force of which holds the lever in position with the lowest point of the eccentric normally under a brake-shoe 109, pivotally hung in a support 110, secured to the frame. (See Fig. 10.) The brake-shoe 109 is shaped to bear on the surface of the drum. This lever and brake are used when the shock-box is being returned to horizontal position after having been discharged of its contents, to prevent the consequent jar or jam by the quick movement and lodgment of the box. The downward pressure on the lever effects the engagement of the shoe on the drum.

Figure 1:
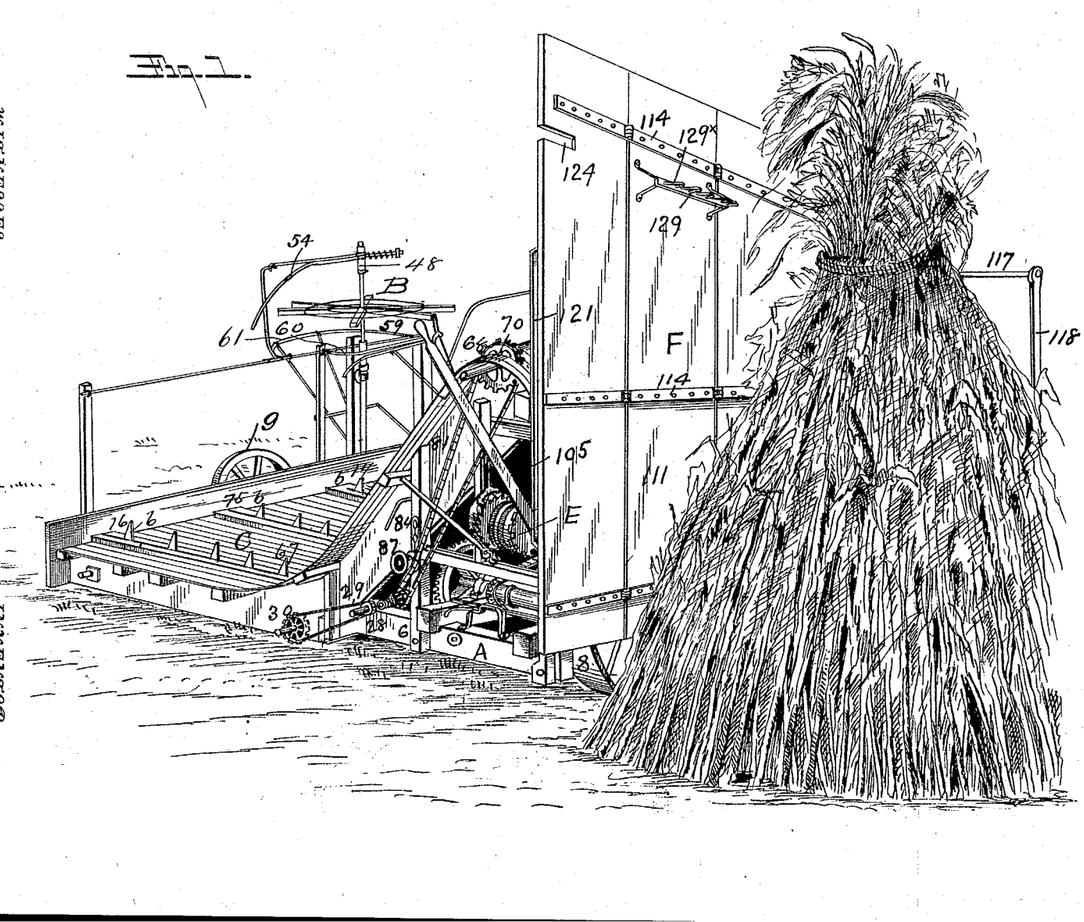
Figure 1 is a perspective of the rear, and side of the machine carrying the shock-box; the shock-box being shown in upright position and extended flat against the side of the machine.

F designates the shock-box, consisting of the bottom piece 111, the inner side piece 112, and the two-part outside piece 113, hinged together by substantial strap-hinges 114, so as to turn out flat when the box is turned upright as shown in Fig. 1 of the drawings. The bottom of the shock-box is provided with a sleeve or keeper 115, (see Fig. 2,) through which the horizontal bar of the crane is passed, and in this way the shock-box is supported. The shock-box is mounted on the crane with the longer portion to the rear of the support, so that it naturally falls back into horizontal position and is maintained therein by the rear portion overbalancing the front portion. To sustain the inner side 112 vertically, the front end takes under a latch or keeper 116, a roller 116$^\times$, being journaled therein to prevent the wear on the edge of the side when the box is turned back.

In front of the machine on the standards is journaled a bar 117, projecting over and across the shock-box, (see Fig. 6,) and on the end of this bar 117 is a bar 118, formed with a hook 119, which engages with the end of the crane, behind a collar 120, thereon, to hold the side 113 vertical. The bar 118 is arranged through a long keeper 121, on the outer face of the side. This keeper holds the bar 118 in position against the box-side and from slipping off the end of the box-support, while the shock-box is being tilted, and it also serves as a guide to the bar when it has been unhooked and withdrawn, to permit the box to be opened. After the box has passed the shock, and has been reformed, the bar is again put in the keeper and hooked to the end of the box-support.

It will be perceived that as the shock-box is raised by the vertical movement of the crane and tilted by the restraining effect of the inner side-piece under the roller 116×, the bar 118 has sufficient space in the keeper to let the bar escape from the keeper and yet bear against the outer hinged side of the box until it is no longer essential to hold the box-side vertical.

On the end frame of the machine is a curved bar 122, which is engaged by a keeper and guide-piece 123, on the side 112 of the shock-box, which parts keep the box in relative position when being tilted into verticality. In the side 113 of the shock-box is an open end slot 124, and on the face of the side 112 are a number of hooks 125. The object of these is to provide means for holding and compressing the shock while being tied and to hold the shock from falling forward when the shock-box is being tilted to discharge the bundle or shock. This is done by means of a lever 126, having an eye 127, in its end to engage one of the hooks 125. (See Fig. 2). The bar of the lever being arranged in the slot 124, and being pressed down therein, it may be held in such position by a latch-bar 127×, pivoted on the side of the box and provided with lateral projections 128, which are adapted to bear on the lever and hold it in any desired position to which it is pressed down.

In the bottom of the shock-box is a bench 129, having a rack 129×, on it, on which the stalks lodge and are thus held so as to make the tops appear of about the same bulk as the butts in the box; and so that the compression of the lever at that part may be entirely effective, and the stalks held free from the bottom of the box when being tied into a bundle or shock.

If a shock-box of the character shown and described were mounted to simply turn on its support, its length would necessitate either mounting the cutting-mechanism too high or building the inclined portion of the table longer than otherwise required; so in order to have the machine run low and cut low down, and to make the other parts correspondingly lower, I provide means for lifting the shock-box vertically before dumping it. This is accomplished by means of the vertically movable bracket supporting the shock-box; the bracket being connected to the rope which is fastened to the drum, so that by turning the drum the bracket is lifted and carries with it the shock-box, which when being raised, is turned or tilted under the restraint of the keeper 116 until the shock therein is made to stand upright.

The special operation of the respective parts have been specified in their description. Their consecutive or conjoint operation may be stated as follows: The team being hooked up to the tongue T, to pull the machine, and being started, the guards at the sides direct the rows to be acted on, to the engagement of the reels, and the central guard lifts the leaning stalks, so that the rows when cut by the cutters fall naturally back and across on the floor of the machine, with the tops to the rear, in which position they are engaged by the pins of the carrying-chains and carried off the lower floor up the inclined floor, and drop over the upper end of the incline into the shock-box. When the shock-box is full the machine is stopped, the lever 126 is arranged over the shock with the end in engagement with a hook on the inner side of the box and then pressed down and secured by the latch-bar on the outer side of the box. The shock is then tied. The drum is now brought into action through the instrumentality of its lever and by the connections therewith, the shock-box is lifted and turned or tilted upright and the shock set on its butts. The compressing lever may now be removed and the hook on the end of the crane disengaged, when the bottom and outer side of the box can be swung out flat, and the whole box be in flat position as seen in Fig. 1 of the drawings. This flat position of the box permits the machine to be moved on past the shock just deposited, when the box can be righted, lowered and reorganized or assembled in its relation to the machine to receive another supply of stalks.

What I claim as novel is—

1. The combination with the reels at the front of the machine, of the socket-pieces on the top of the reel-shafts, having lugs projecting therefrom, arms secured to the socket pieces, and projected over the reels, and resilient bars connected to the lugs of the socket-pieces whereby the said arms are given a yielding function.

2. The combination with the reels at the front of the machine, of the socket-pieces on the ends of the reel-shafts, having lugs projecting therefrom guards arranged to project in advance of each reel, an arm over each reel projecting from the socket-piece, and a spring controlled bar secured to the lugs of the socket pieces to control the movement of said arms.

3. The combination of the shock-box, a crane having its horizontal arm journaled in keepers on the bottom of the box, and means to lift the crane vertically.

4. The shock-box composed of two sides and a bottom hinged together, a hook fixed to the inner side of the box, and the outer side having a vertical slot opposite to the hook of the other side, in combination with a lever 126, adapted to engage the hook and enter the said slot, and a latch to engage and hold the lever.

5. The combination with the shock-box provided with an outer hinged-side, and the box-support having its end extended beyond the outer side of the box, of a rod 117 journaled above the box and provided with a depending bar 118 on its outer end, formed with a hooked end to engage the end of the box support and lie against the outer side of the box, substantially as and for the purpose specified.

6. The combination of the shock-box, the crane supporting the same, the vertically movable bracket supporting the crane, a drum journaled in the machine, a lever to turn the drum, and a rope connected to the drum and to the bracket, as described.

7. The combination with the hinged shock-box provided with hooks on its inner side and an open-end slot in its outer side, of a stalk support in the bottom of the box, a lever adapted to engage the hooks and enter the open-end slot, and a latch to hold the lever down, as described.

In witness whereof I have hereto set my hand in the presence of two attesting witnesses.

WILLIAM R. STEINER.

Attest:
WILLARD F. LEASE,
GEORGE R. MERCHANT.